United States Patent
Saxe et al.

(10) Patent No.: US 11,914,696 B1
(45) Date of Patent: Feb. 27, 2024

(54) QUORUM-BASED ACCESS CONTROL MANAGEMENT

(71) Applicant: Amazon Technologies, Inc., Seattle, WA (US)

(72) Inventors: Dean H Saxe, Seattle, WA (US); Conor P Cahill, Waterford, VA (US); Dennis Tighe, Seattle, WA (US); Jonathan Robert Hurd, Bainbridge Island, WA (US); Brian Mead Tyler, Woodinville, WA (US); Cristian Marius Ilac, Sammamish, WA (US); Mark Ryland, Great Falls, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/039,864

(22) Filed: Sep. 30, 2020

(51) Int. Cl.
  *G06F 21/40* (2013.01)
  *G06F 21/62* (2013.01)
  *G06F 9/48* (2006.01)

(52) U.S. Cl.
  CPC ............ *G06F 21/40* (2013.01); *G06F 9/4843* (2013.01); *G06F 21/62* (2013.01); *G06F 2221/2137* (2013.01); *G06F 2221/2141* (2013.01)

(58) Field of Classification Search
  CPC ............ G06F 21/40; G06F 21/62–629; G06F 2221/2137; G06F 2221/2141; G06F 9/4843; H04L 63/10–108
  See application file for complete search history.

(56) References Cited

U.S. PATENT DOCUMENTS

| | | | |
|---|---|---|---|
| 6,775,668 B1* | 8/2004 | Goel | G06F 21/6227 707/999.009 |
| 8,014,756 B1* | 9/2011 | Henderson | G06Q 20/322 455/411 |
| 8,285,825 B1* | 10/2012 | Nagaraj | H04L 41/18 709/219 |
| 9,077,758 B1* | 7/2015 | McGovern | G06F 21/604 |
| 9,300,639 B1 | 3/2016 | Roth | |
| 9,386,033 B1 | 7/2016 | Rossman | |
| 9,712,535 B1 | 7/2017 | Rossman | |
| 9,967,285 B1 | 5/2018 | Rossman | |
| 10,038,700 B1 | 7/2018 | Duchin | |
| 10,050,999 B1 | 8/2018 | Rossman | |
| 10,291,622 B1 | 5/2019 | Rossman et al. | |
| 10,296,750 B1 | 5/2019 | Rossman | |
| 10,367,834 B2 | 7/2019 | Sweet et al. | |
| 10,476,847 B1 | 11/2019 | Smith | |
| 10,482,231 B1* | 11/2019 | Harding | G06F 21/33 |
| 10,523,716 B1* | 12/2019 | Stickle | H04L 63/205 |

(Continued)

OTHER PUBLICATIONS

U.S. Appl. No. 16/917,840, filed Jun. 30, 2020, Kazi Naim Al-Rashid et al.

*Primary Examiner* — Madhuri R Herzog
(74) *Attorney, Agent, or Firm* — S. Scott Foster; Kowert, Hood, Munyon, Rankin & Goetzel, P.C.

(57) ABSTRACT

Quorum-based access control management may be implemented. Quorum controls may be created for determining whether to perform or deny access control operations to perform privileged tasks. When an access control operation is received, approval of the operation may be requested from members for the quorum control. If a policy for the quorum control is satisfied by approval responses, then approval to perform the access control operation may be provided.

20 Claims, 8 Drawing Sheets

(56) References Cited

U.S. PATENT DOCUMENTS

| | | | |
|---|---|---|---|
| 10,601,816 B1 | 3/2020 | Stickle et al. | |
| 10,678,658 B2 | 6/2020 | Tomlinson et al. | |
| 10,951,606 B1 | 3/2021 | Shahidzadeh | |
| 11,100,489 B2 | 8/2021 | Lee | |
| 11,159,309 B2* | 10/2021 | Seyfried | H04L 9/0819 |
| 11,164,165 B1* | 11/2021 | Andreev | G06Q 20/02 |
| 11,200,310 B2 | 12/2021 | Shafet | |
| 11,206,258 B2 | 12/2021 | Ericson | |
| 11,240,030 B2 | 2/2022 | Sarin | |
| 11,270,311 B1 | 3/2022 | Jass | |
| 2005/0114650 A1 | 5/2005 | Rockwood | |
| 2007/0261103 A1* | 11/2007 | Viavant | G06F 21/40 |
| | | | 726/2 |
| 2008/0243933 A1* | 10/2008 | Holtzman | G06Q 10/10 |
| 2014/0280955 A1 | 9/2014 | Stuntebeck | |
| 2016/0380989 A1 | 12/2016 | Bailey | |
| 2017/0076518 A1* | 3/2017 | Patterson | G06F 21/00 |
| 2017/0093863 A1 | 3/2017 | Galtsev | |
| 2017/0093904 A1 | 3/2017 | Ng | |
| 2019/0236297 A1* | 8/2019 | Efendiyev, Jr. | H04L 9/3226 |
| 2019/0268342 A1 | 8/2019 | Rossman | |
| 2019/0394175 A1 | 12/2019 | Zhang | |
| 2020/0007314 A1 | 1/2020 | Vouk | |
| 2020/0204357 A1 | 6/2020 | Seyfried | |
| 2020/0401325 A1 | 12/2020 | Lamba | |
| 2021/0056539 A1* | 2/2021 | McCauley | H04L 9/0897 |
| 2021/0110047 A1 | 4/2021 | Fang | |
| 2021/0173897 A1 | 6/2021 | Jakobsson | |
| 2021/0203657 A1 | 7/2021 | Huapaya | |
| 2021/0304206 A1 | 9/2021 | Juneja | |
| 2021/0304316 A1 | 9/2021 | Leddy, III | |
| 2021/0352097 A1 | 11/2021 | Vlahovic | |

\* cited by examiner

FIG. 8

QUORUM-BASED ACCESS CONTROL MANAGEMENT

BACKGROUND

A cloud provider, or other provider network, may implement multiple network-based services. These services may provide different functionality, such as computational resources, storage resources, data transmission, among various others. Access controls to coordinate the identity and privileges of different users to obtain, use or otherwise manage resources from the network-based services may be implemented to secure the use of managed resources for authorized users.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for quorum-based access control management are described herein. Access control systems may provide or enforce credentials for authenticating and determining the abilities of requested actions taken by a user of one (or more) protected systems. Access control operations may be requested to, among other operations, modify the mechanism or way in which an access control system is applied to users, in various embodiments. For example, access control systems may manage credentials for protected systems by setting or resetting passwords, enabling or setting up multi-factor authentication, and/or configuring other authentication or credential information. As the complexity of systems protected by access control systems grows and the scale and speed at which access control problems need to be managed increases, techniques that provide secure and fast approval for access control operations are highly desirable. In various embodiments, quorum-based access control management may provide both increased security and speed for handling access control operations, which may be performed in order to resolve protected system errors or operational demands.

Figure 1:
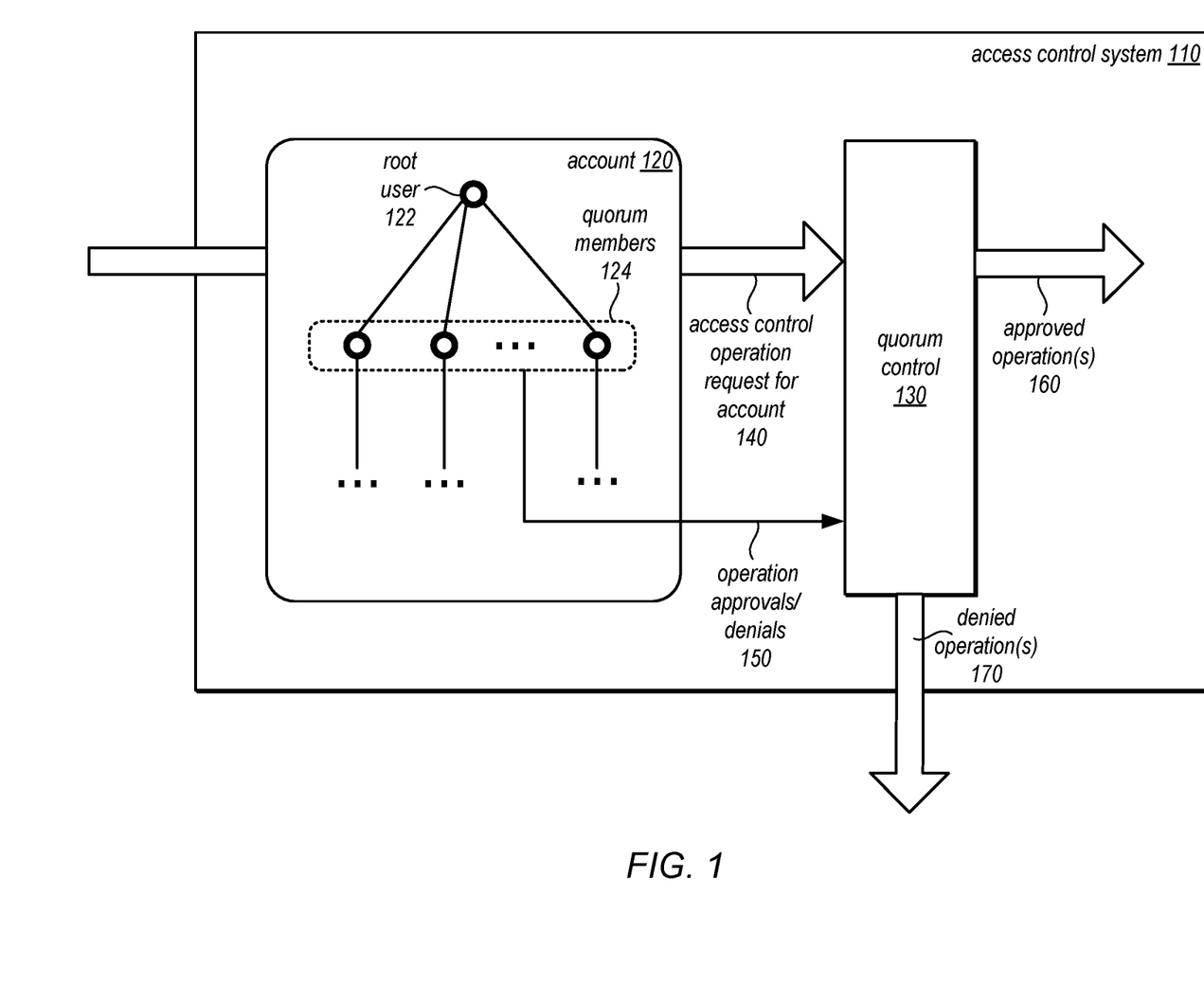
FIG. 1 illustrates a logical block diagram of quorum-based access control management, according to some embodiments.

FIG. 1 illustrates a logical block diagram of quorum-based access control management, according to some embodiments. Access control system 110 may protect one (or multiple) systems or services, including public services offered by a provider network, like those discussed below with regard to FIG. 2, or stand-alone or private systems. Access control system 110 may be implemented across one (or multiple) computing systems or devices, like computing system 1000 discussed below with regard to FIG. 8. Access control system 110 may manage access controls for users of accounts, like account 120. Account 120 may have multiple users and roles for the users, in some embodiments. In some embodiments, an account 120 may have a root user 122, which may be a user identity that created or owns account 120. In various embodiments, root user 122 may be used to create or management other users, roles, or identities within account 120.

Access control operation requests 140 for account 120 may handle various operations of access control system enforced for account 120, such as the creation of users, roles, or managing the properties of users (or groups of users) or roles, in some embodiments. At least some of these operations for access control may be to perform privileged tasks, in some embodiments. For example, a privileged task may be task reserved for a unique user, role, or other task that may provide greater privileges of system control and thus may be considered a sensitive task deserving of extra scrutiny before being authorized for performance.

In some embodiments, whether a task is considered privileged for which a quorum control is enforced may be according to the particular user targeted by an access control operation. For example, for some users, access control operation requests 140 may be handled using other authorization schemes (e.g., a user with a security administrator role may have permission to reset passwords, add MFA devices, etc.). For some users, such as root user 122, there may be no other user that can easily or safely manage the root user 122 information and therefore root user management operations may be considered one example of a privileged task. Therefore for root user directed operations or other privileged tasks, quorum controls, like quorum control 130 may be implemented, in various embodiments, to handle access control operations for a privileged task (e.g., which may be highly sensitive, important, or otherwise prone to causing significant problems if not thoroughly vetted, like changes to root user 122). Instead of implementing authentication procedures that require manual intervention from an external system or service (e.g., a provider network customer service representative), which may increase the time of resolution significantly, access control operation approval can be handled internally by users within account 120 with greater speed, and with greater scrutiny and security. In at least some embodiments, quorum members 124 may be able to approve or deny requested access control operations in place of root user 122 (e.g., effectively replacing root user 122 with quorum 124).

For example, in various embodiments, quorum control 130 may be implemented for some access control operation requests for account 120. Quorum control 130 may be created for account 120, as discussed in detail below with regard to FIGS. 3, and 6 to handle approval of access control operations 140. Approved operations 160 may be performed by access control system 110, while denied operations 170 may be dropped, failed, returned with an error, otherwise not performed, in some embodiments, by access control system 110. Quorum control 130 may utilize the approval or denial 150 of a requested access control operation from quorum members 124 that may be identified for the quorum control 124. Approval or denial may thus be shifted from external systems or controls to internal users within account 120. For example, quorum members 124 could be users associated with high-responsibility roles in an organizations management structure, such as operations, security, and/or development. Vetting of requests may be performed by quorum members that are users with better knowledge as to the need for a proposed change to sensitive account information, like password resets, randomization, or MFA settings for root user 122.

The previous description of a quorum control for an access control system 110 in FIG. 1 is a logical illustration and thus is not to be construed as limiting as to the architecture for implementing an access control system 110. Moreover, as discussed below with regard to FIGS. 5-8, quorum controls enforced to determine authorization for access control operations may be implemented separately or independently from the access control system that performs the access control operations.

This specification begins with a general description of a provider network that implements an identity and access management service for different services across provider network regions. Then various examples of the identity and access management service including different components/modules, or arrangements of components/module that may be employed as part of implementing the identity and access management service are discussed. A number of different methods and techniques to implement quorum-based access control management are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
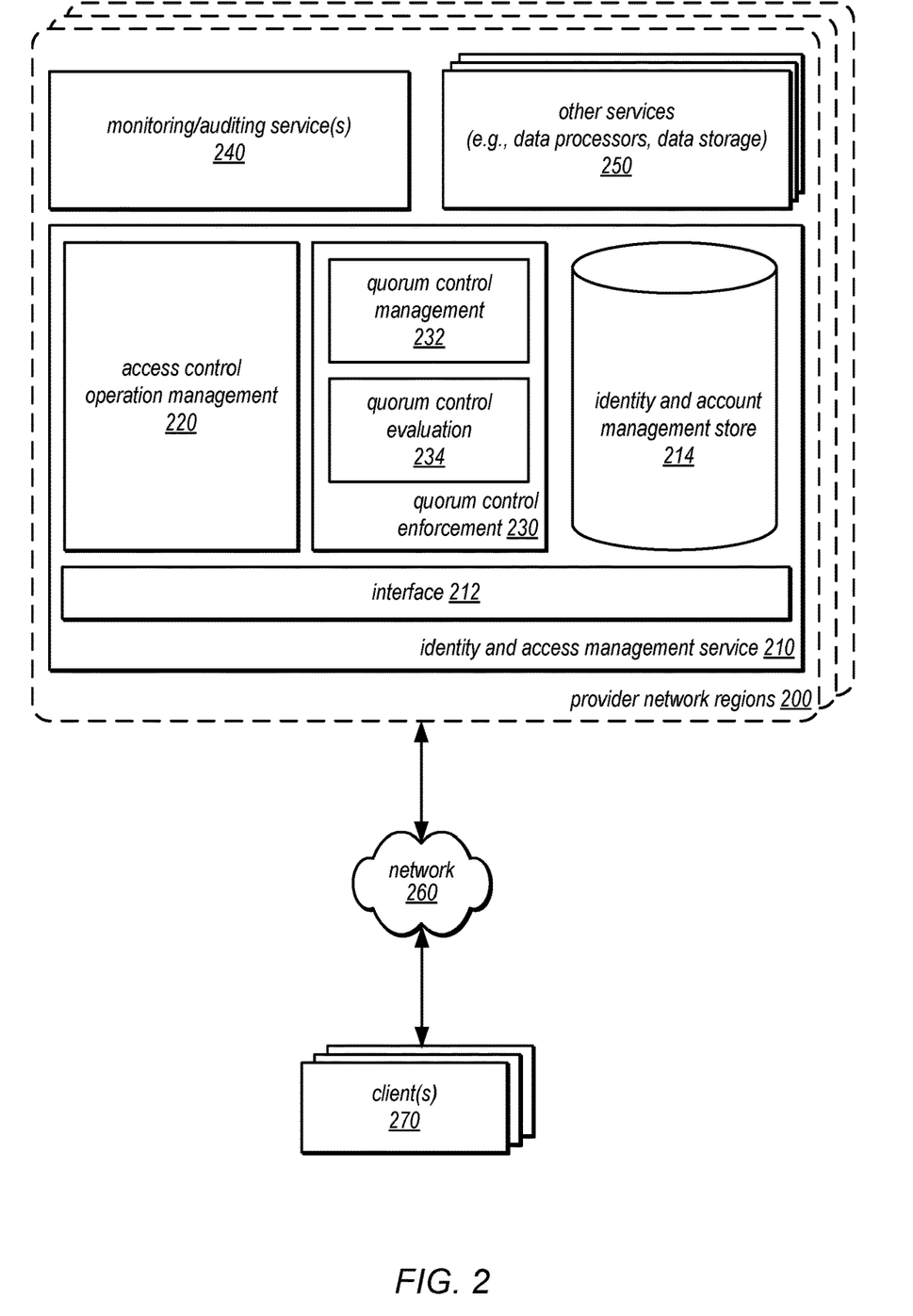
FIG. 2 is a logical block diagram illustrating a provider network implementing an identity and access control management service that implements quorum-based access control management, according to some embodiments.

FIG. 2 is a logical block diagram illustrating a provider network implementing an identity and access control management service that implements quorum-based access control management, according to some embodiments. In various embodiments, a provider network may be a private or closed system or may be set up by an entity such as a company or a public sector organization to provide one or more services (such as various types of cloud-based storage, processing, or other computing resources) accessible via the Internet and/or other networks to clients 270. The provider network may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the provider network.

For example, the provider network (which may, in some implementations, be referred to as a "cloud provider network" or simply as a "cloud") may refer to a pool of network-accessible computing resources (such as compute, storage, and networking resources, applications, and services), which may be virtualized or bare-metal (e.g., providing direct access to underlying hardware without a virtualization platform). In this way, the provider network can provide convenient, on-demand network access to a shared pool of configurable computing resources that can be programmatically provisioned and released in response to customer commands. These resources can be dynamically provisioned and reconfigured to adjust to variable load.

The provider network can be formed as a number of regions, such as provider network regions 200, where a region may be a separate geographical area in which the provider network clusters or manages data centers, in some embodiments. Each region 200 may include two or more availability zones (sometimes referred to as fault tolerant zones) connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Clients 270 can connect to availability zones of the provider network via a publicly accessible network (e.g., the Internet, a cellular communication network). Regions 200 may be connected to a global network which includes private networking infrastructure (e.g., fiber connections controlled by the cloud provider) connecting each region to at least one other region. The provider network may deliver content from points of presence outside of, but networked with, these regions 200 by way of edge locations and regional edge cache servers. This compartmentalization and geographic distribution of computing hardware enables the provider network to provide low-latency resource access to customers on a global scale with a high degree of fault tolerance and stability.

In some embodiments, a provider network may implement various computing resources or services across one or more regions, such as identity and management service 210, auditing/monitoring service(s) 240, and other services 250, which may include a virtual compute service, data processing service(s) (e.g., map reduce, data flow, and/or other large scale data processing techniques), data storage services (e.g., object storage services, block-based storage services, database services, or data warehouse storage services) and/or any other type of network-based services (which may include various other types of storage, processing, analysis, communication, event handling, visualization, and security services not illustrated). The resources used to support the operations of such services (e.g., compute and storage resources) may be provisioned in an account associated with the provider network, in contrast to resources requested by users of the provider network 200, which may be provisioned in user accounts, in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system 1000 illustrated in FIG. 8 and described below. In various embodiments, the functionality of a given system or service component (e.g., a component of identity and access management services 210 or other services 250) may be implemented by a particular node or may be distributed across several nodes. In some embodiments, a given node may implement the functionality of more than one service system component (e.g., more than one data store component).

Identity and access management service 210 may implement quorum-based access control management, as discussed above with regard to FIG. 1 and below with regard to FIGS. 3-7. Identity and access management service 210 may provide operators of other services 250 and auditing/monitoring service 240, with the ability to enforce access controls for various types of users and various roles of users associated with an account according to the identity determined for and shared by identity and access management service 210. For example, identity and access management service 210 can provide fine-grained access controls to different service resources, support different authentication techniques or protocols, such as multi-factor authentication (MFA), support analysis or tools for specifying access controls, and integration features for external or alternative identity and access control mechanisms, in some embodiments. User controls may be implemented to determine what, wherein, and when users can access resources and how the resources may be used by users, including federated users to provide management for groups of users and/or roles which may support features like single sign-on (SSO), in some embodiments.

Identity and access management service 210 may implement interface 212. Interface 212 may be a programmatic interface (e.g., supporting one or more APIs), graphical (e.g., providing a web-based console or other graphical control), and/or command line interfaces, in various embodiments, to allow for the specification and management of various Identity and access management service 210 features, including quorum controls as discussed below with regard to FIGS. 3 and 4 for performing access operations, such as various root user management operations or other privileged tasks as discussed above with regard to FIG. 1.

Identity and access management service 210 may implement access control operation management 220, in various embodiments. Access control operation management 220 may implement one (or multiple) resources for handling requests to create, modify, or delete access control artifacts or entities within identity and access management service 210, such as various user operations, like root user management operations. Access control operation management 220 may parse operation requests, determine whether quorum control is applicable, send approval requests to quorum control enforcement 230 (or apply other approval/control techniques), direct the performance of the updates (e.g., by causing the requested credential reset, MFA addition/setting, etc.). Updated information may be stored in identity and account management store 214, which may be used to enforce or provide responses to various services that want to check authorization for various users, in some embodiments.

Identity and access management service 210 may implement quorum control enforcement 230, in various embodiments, in order to allow for quorum controls to be created, updated, deleted, and enforced, as discussed below with regard to FIGS. 3 and 4. For example, quorum control enforcement 230 may implement quorum control management 232 to handle creation, update, and delete requests for quorum controls, in some embodiments. In some embodiments, quorum control management may implement quorum control evaluation 234 for determining whether a requested access control operation may be performed according to a policy specified for the quorum control identifier for the requested operation.

In various embodiments, a provider network may implement monitoring service 240. Auditing/monitoring service 240 may provide service event and information logging and monitoring to provide auditing and observability for clients (e.g., customers of services 250), including some of the approval and other quorum control information exchanged as discussed below with regard to FIGS. 3 and 4. For instance, approved and denied access control operations may be logged by auditing/monitoring service 240 in order to detect events or alarms based on, for instance, number of failed attempts, or may provide insight for recognizing repeated requests for changes that may not satisfy regulatory standards for access controls, in some embodiments.

Generally speaking, clients 270 may encompass any type of client configurable to submit network-based requests to provider network regions 200 via network 260, including requests for other services 250 (e.g., a request to create a database, start a computation job, setup a data stream, etc.). In some embodiments, operators of a service (e.g., service 250) may be a client 270 that performs requests to specify quorum controls and/or access control operations, in some embodiments. For example, a given client 270 may include a suitable version of a web browser, or may include a plug-in module or other type of code module configured to access a management console to specify quorum controls and/or access control operations. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application configured to interact directly with provider network region 200. In some embodiments, client 270 may be configured to generate network-based services requests according to a Representational State Transfer (REST)-style network-based services architecture, a document- or message-based network-based services architecture, or another suitable network-based services architecture. Although clients 270 are illustrated as external to provider network 200, in some embodiments clients of different services, like other services 250, can be implemented within provider network region 200 (e.g., implemented on a resource of another service 250, such as virtual compute instance).

Clients 270 may convey network-based services requests to and receive responses from provider network regions 200 via network 260. In various embodiments, network 260 may encompass any suitable combination of networking hardware and protocols necessary to establish network-based-based communications between clients 270 and provider network regions 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 270 and provider network region 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network region 200. It is noted that in some embodiments, clients may communicate with provider network region 200 using a private network rather than the public Internet.

Figure 3:
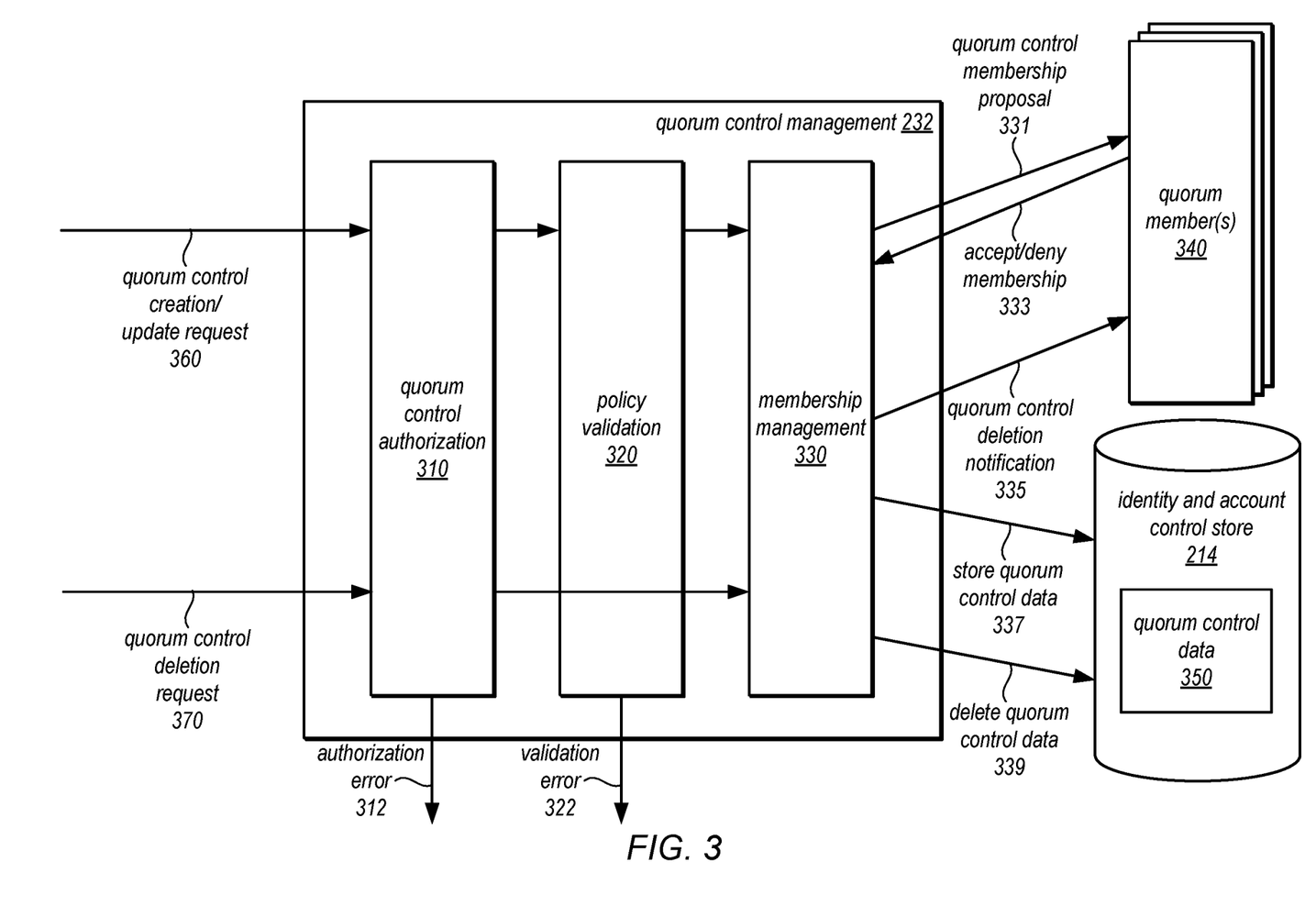
FIG. 3 illustrates example interactions to establish a quorum for quorum-based access control management, according to some embodiments.

FIG. 3 illustrates example interactions to establish a quorum for quorum-based access control management, according to some embodiments. Quorum control creation 232 may handle operations to manage a quorum control, in some embodiments, such as the various techniques discussed below with regard to FIG. 6. For example, a quorum control creation/update request 360 may be received, in some embodiments, via an interface, such as interface 212. The creation/update request 360 may specify various features of the quorum control such as an identifier for the quorum, identifier of members or types of approvers (roles), approval polic(ies) for operation(s), TTL for obtaining approval, and notification mechanisms for members, in some embodiments. Quorum control creation 232 may implement quorum control authorization 310, which may evaluate whether or not a requesting user has the authority to create a quorum control, in some embodiments. For example, quorum control authorization 310 may rejection quorum control creation or edit requests 360 from non-root users, in some embodiments. In some embodiments, an authorization error 312 may be sent.

Quorum control management 232 may implement policy validation 320, in some embodiments. Policy validation 320 may apply various policy validation rules to determine whether an approval policy specified for a quorum control is valid, in some embodiments. For example, a minimum number of approvers may have to be specified that is greater than 1 and less than the total number of approvers. In some embodiments, whether or not weighting schemes for votes or geographic requirements for approval may also be considered (e.g., geographic requirements may not be valid if members are not distributed geographically). For quorum control creation request or updates that are invalid, policy validation 320 may send an error indication.

Quorum control management 232 may implement membership management 330 to handle interactions with proposed quorum members (or to propose quorum control changes). For example, as indicated at 331, membership management 330 may send quorum control membership proposals 331 to quorum members 340. These proposals may be sent through communication channels specified in the creation/update request 360. Quorum members (or a subset of quorum members 340) may accept or deny the quorum control membership in responses 333. Membership management 330 may evaluate whether enough acceptances have been received to create/enforce the quorum control (e.g., according to an approval policy or a different quorum control approval policy, which may or may not be specified by the quorum creation control request). For example, a minimum number of acceptances may have to be obtained. In some embodiments, denial of accepting quorum membership could result in a failure of the quorum control to be created or could be a vote against the quorum control (which could still succeed if enough approval votes were received). Similar interactions and requests may be exchanged for quorum control updates. Failed updates may not be applied. Successful creation requests (or updates) may be stored 337 as quorum control data 350 in identity and account management store 214, in some embodiments. In some embodiments, quorum membership (and creation) may not be subject to approval. For example, quorum members can be added without responding or accepting. In such scenarios, notifications of quorum membership may (or may not) be sent.

Quorum control deletion requests 370 may be treated like updates or may be separately handled. For example, a quorum control deletion request (if authorized) may be sent to membership management 330, which may submit proposals and evaluate responses. In some embodiments, an authorized user for a quorum control deletion request (e.g., a root user) may delete the quorum control without quorum authorization and thus membership management 330 may submit a quorum control deletion notification 335 to quorum members 340 and may delete 339 quorum control data 350 from identity and account management store 214.

Figure 4:
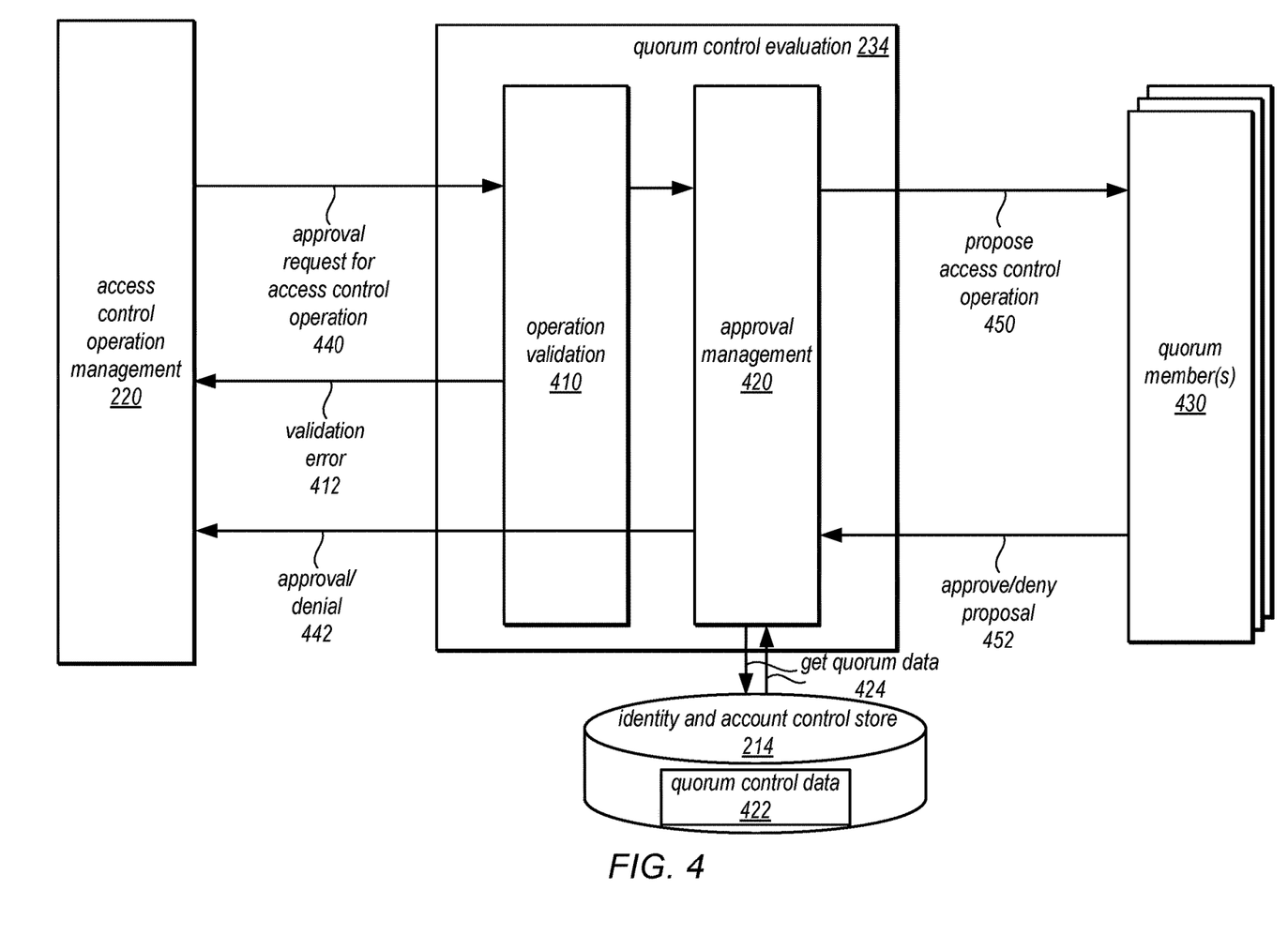
FIG. 4 illustrates example interactions to perform access control management operations utilizing an established quorum for quorum-based access control management, according to some embodiments.

FIG. 4 illustrates example interactions to perform access control management operations utilizing an established quorum for quorum-based access control management, according to some embodiments. Quorum control creation 232 may implement various techniques, such as the techniques discussed below with regard to FIG. 7. Quorum control evaluation 234 may handle various requests and/or interactions to support and enforce quorum controls for access control operations, in some embodiments. For example, quorum control evaluation 234 may implement operation validation 410, in some embodiments. Operation validation may receive a request for approval of an access control operation 440 from access control operation management 220 and determine whether the operation is valid for quorum control. Some operations may, for instance, not be specified for handling in the policy for the quorum control and thus may be handled using a different mechanism (e.g., other automated handling techniques, human agent handling, etc.). For invalid operations, operation validation 410 may return a validation error 412 to access control operation management 220 (which may forward or include the information for the error in a response to a client that submitted the access control operation request).

Quorum control evaluation 234 may implement approval management 420 to handle obtaining approval and determining whether a policy for a quorum control is satisfied, in some embodiments. For example, approval management 420 may get 424 quorum control data 422 for the quorum control from identity and account management store 214, in some embodiments in order to obtain members and policy information for evaluation. Approval management 420 may then propose the access control operation 450 to quorum member(s) 430. In some embodiments, a minimal number of members 430 may be tried and then a larger number of a response is not received within some retry time period. In some embodiments, all members 430 may be sent proposals. Approval management may include information for determining whether the access control operation should be performed (e.g., identity of requesting user, operation type, operation parameters, time of request, etc.).

Quorum members may approve or deny the proposal, as indicated at 452. Identity and access management service 210 may support various communication channels for sending proposals 450 and accepting responses 452, such as programmatic interfaces for client applications or devices operated by a user that is a quorum member to submit responses, including a web-based console, electronic message, notification, application installed or downloaded to a client, among others. Approval management 420 may determine based on the responses whether the proposed action should be approved or denied according to the policy for the quorum control and provide a response 442 to access control management operation 220 that indicates approval or denial. In some embodiments, approval management 420 may update auditing and/or monitoring services 240 with information about the request, approval process (e.g., approved, denied, by which quorum members, etc.).

Although FIGS. 2-4 have been described and illustrated in the context of an identify and access management service, the various techniques and components illustrated and described in FIGS. 2-4 may be easily applied to other access control systems in different embodiments for one or multiple different systems or services, which may be public or private. As such, FIGS. 2-4 are not intended to be limiting as to other embodiments of a system that may implement quorum-based access control management.

Various different systems and devices may implement the various methods and techniques described below, either singly or working together. For example, an identity and access management service such as described above with regard to FIGS. 2-4 may be configured to implement the various methods. Therefore, the above examples and or any other systems or devices referenced as performing the illustrated method, are not intended to be limiting as to other different components, modules, systems, or configurations of systems and devices.

Figure 5:
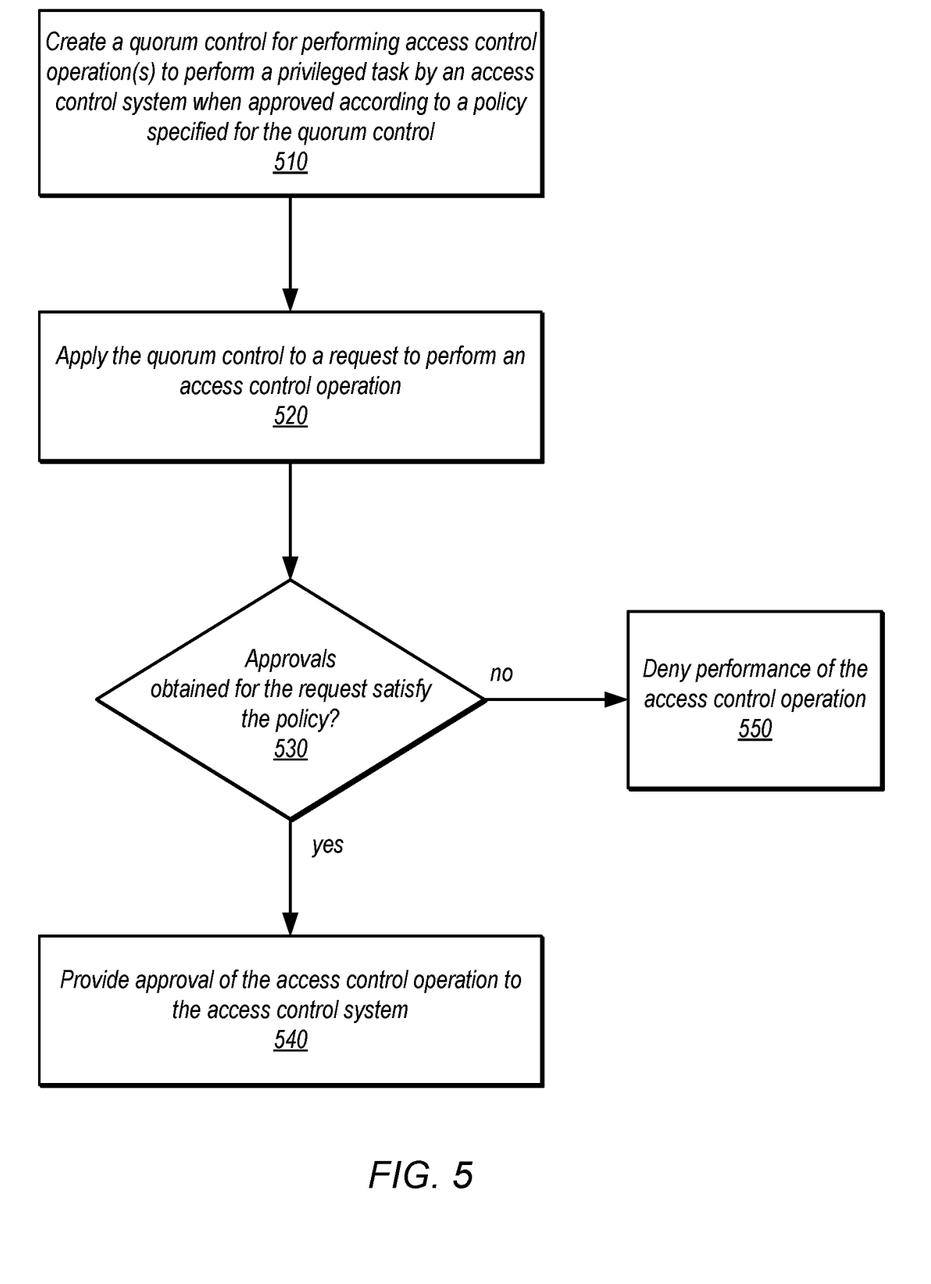
FIG. 5 is a high-level flowchart illustrating various methods and techniques to implement quorum-based access control management, according to some embodiments.

FIG. 5 is a high-level flowchart illustrating various methods and techniques to implement quorum-based access control management, according to some embodiments. As indicated at 510, a quorum control may be created for performing access control operation(s) to perform a privileged task by an access control system when approved according to a policy specified for the quorum control. Quorum controls may be created in response to requests, in some embodiments, as discussed above with regard to FIG. 3 and below with regard to FIG. 6. In some embodiments, quorum controls may be created when accounts are created, as part of default control system workflow for account creation. When created, the policy, quorum members for approving access control operations and quorum control changes, and other quorum information may be stored for subsequent access and analysis.

Figure 7:
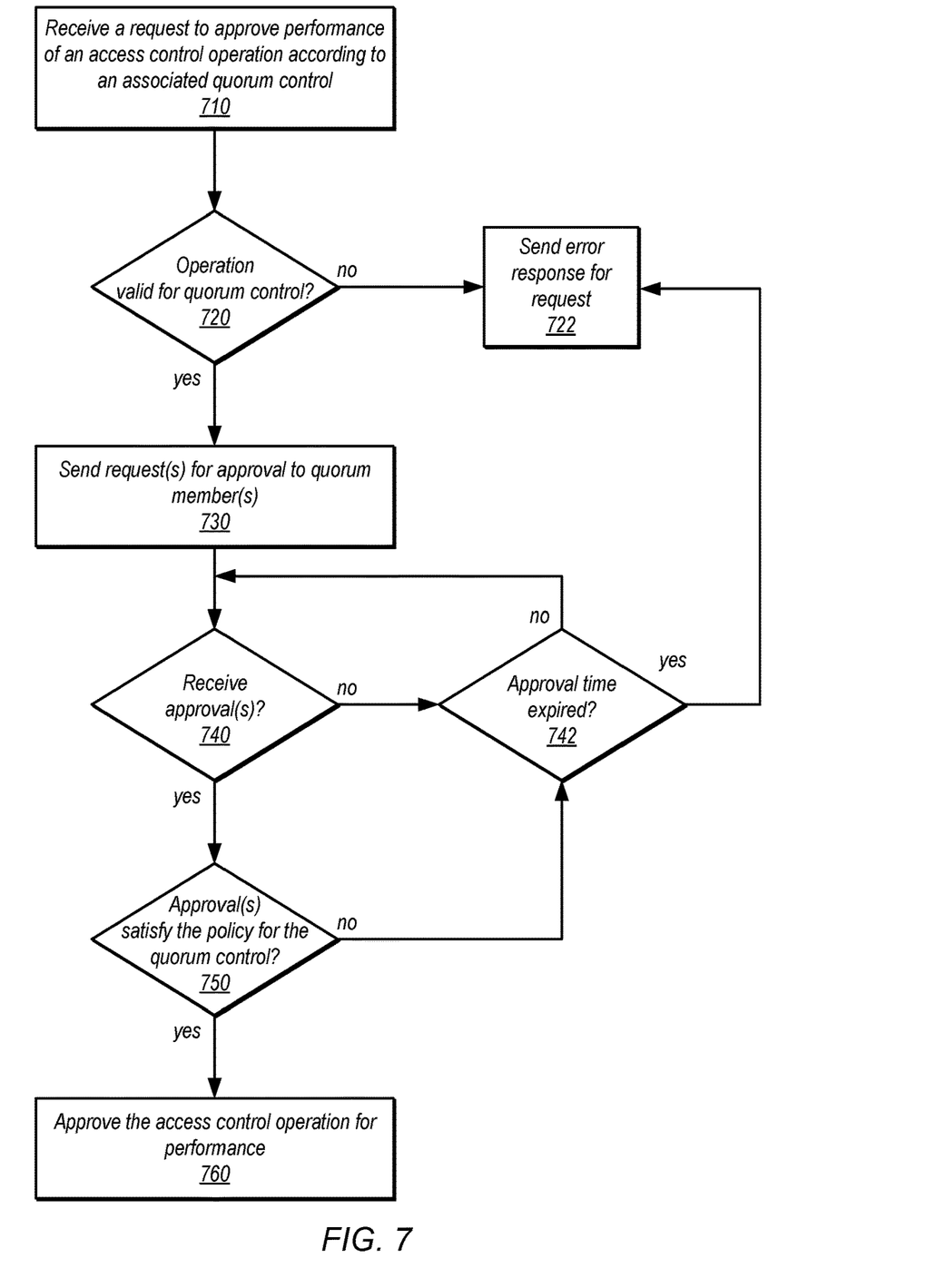
FIG. 7 is a high-level flowchart illustrating various methods and techniques to implement obtaining quorum permission to perform an access control operation, according to some embodiments.

As indicated at 520, the quorum control may be applied to a request to perform an access control operation, in some embodiments. For example, access control requests may be received from a user via a command line interface or control console (e.g., GUI). The request may include identification credentials, which may be verified, to indicate an identity of a user making the request, in some embodiments. The request may include features that identify the quorum control to be applied to the request, in some embodiments. In some embodiments, the request may be evaluated with respect to a quorum control list or other index of operations and users to which the quorum control applies without having the request specify the quorum control apply. FIG. 7 discussed below (as well as FIG. 4 discussed above) provides further detail of application and evaluation of quorum control approvals.

As indicated at 530, approvals obtained from members for the request may be evaluated with respect to the quorum policy, in some embodiments. As discussed above, various types of quorum policies may indicate one or multiple different combinations of votes that can satisfy the policy, in some embodiments. For instance, an equal weight voting scheme may provide each quorum member with an approval to vote (or deny) with equal weight (e.g., 1 approval=1 vote) in order to determine if a minimum number of votes (e.g., 4 votes of 6 possible votes) is met. In some embodiments, different weights may be assigned to allow, for instance, certain members (e.g., with greater expertise or insight) greater authority to approve an operation (e.g., allocating 3 votes to 1 approval from security administrator members and 1 vote to 1 approval from other quorum control members). In some embodiments, other considerations for policies, such as implementing geographic diversity, team/role diversity, or other member characteristics in addition to vote totals may be implemented (e.g., 4/6 possible votes, with at least one vote from 3 different teams). In some embodiments, different quorum policies (or different quorum controls altogether) may be applied to different privileged tasks (or operations to perform privileged tasks). For example, a password reset operation for a root user account could have a higher approval requirement than adding an MFA device, in some embodiments.

If approval is not obtained, then as indicated by the negative exit from 530, performance of the access control operation may be denied, in some embodiments, as indicated at 550. In some embodiments, the access control request may be dropped. In some embodiments, a timeout or other delay mechanism may be submitted before another access control operation of the same type associated with a same user may be allowed or considered. In some embodiments, one or multiple failed attempts may trigger an alarm or other event to notify other users (e.g., security administrators of continued attempts). In some embodiments, an error message or indication may be sent in response to the request. In some embodiments, logs, or other information may be updated with the votes of members and other information that was used to decide that the request was denied.

As indicated at 540, if approvals obtained for the request satisfy the policy, then approval of the access control operation may be provided. A response or other indication that grants permission to perform the access control operation(s) may, for example, be sent. In some embodiments, logs, or other information may be updated with the votes of members and other information that was used to decide that the request was approved.

Figure 6:
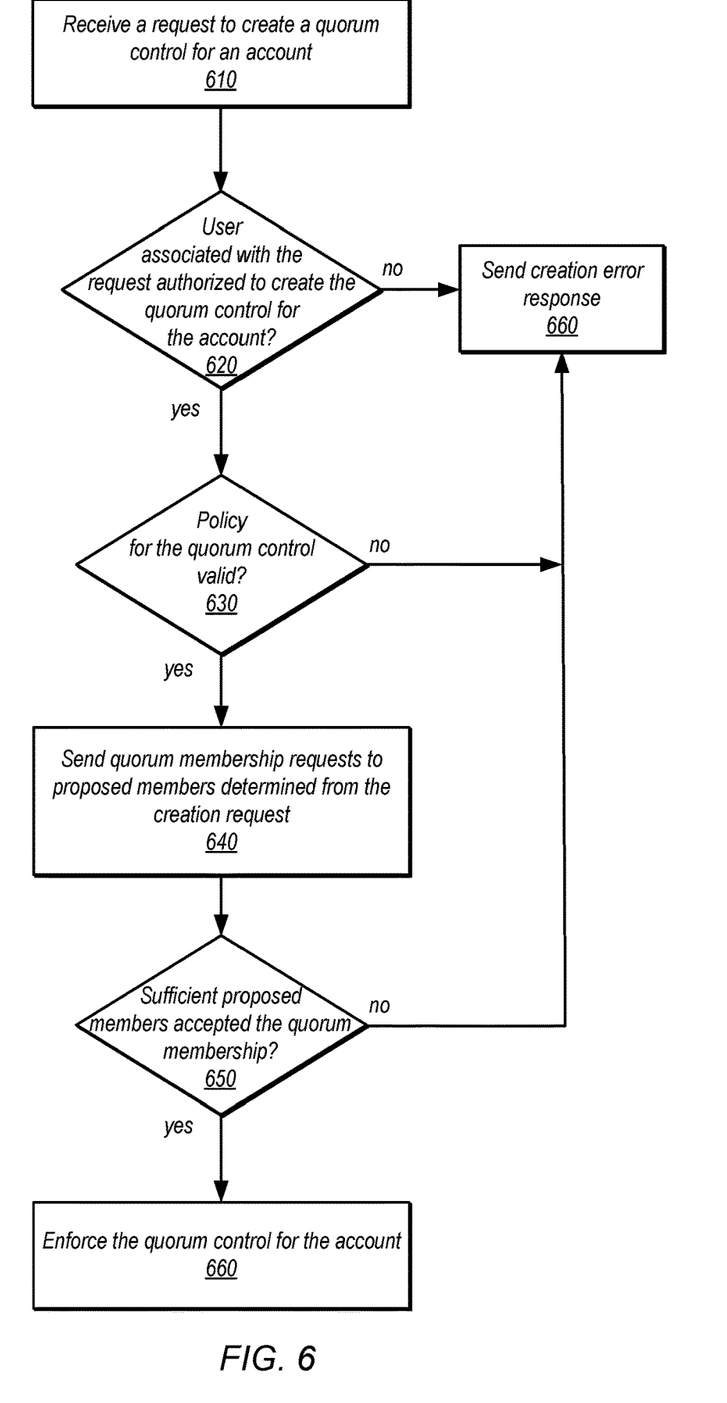
FIG. 6 is a high-level flowchart illustrating various methods and techniques to implement establishing a quorum for quorum-based access control management, according to some embodiments.

Different techniques for creating a quorum control for an access control system may be employed, in some embodiments. FIG. 6 is a high-level flowchart illustrating various methods and techniques to implement establishing a quorum for quorum-based access control management, according to some embodiments. As indicated at 610, a request to create a quorum control for an account may be received, in some embodiments. The creation request may specify various information about the quorum control, such as the policy, proposed members, identifying information for the account, a tag or description for the quorum control that may be used to refer to the quorum control, among other information used to create the quorum control.

In various embodiments, the creation request may specify a user with identity information (e.g., identity credentials) which may be verified (e.g., using authentication techniques, such as name/password combinations, MFA, etc.). In at least some embodiments, the ability to create a quorum set may be restricted to certain users. For example, in some embodiments, only root users for an account may be able to create a quorum control. As indicated at 620, a determination may be made as to whether the user associated with the request to create the quorum control is authorized to create the quorum control, in some embodiments. A privileges list may be evaluated, for instance, to determine whether the user has authorization. As noted earlier, in some embodiments, a single user like a root user account may be the only user able to create a quorum control. For creation requests without user authorization, a creation error response may be sent in response, in some embodiments, as indicated at 660.

In some embodiments, a policy for a quorum control may be validated as part of creating the quorum control, as indicated at 630. For example, various features of a quorum policy, including policy identifier, approval requirements, or proposed quorum members, may be evaluated with respect to one or more policy rules, in some embodiments. The validation rules may, for instance, specify a minimum (and/or maximum) number of proposed members, allowed types of users (e.g., by role, exclude root users, etc.), number/type of approval criteria (e.g., may prohibit quorum requirements of 1 or less or all quorum members, may specify whether (or not) different types of approval policies can be used for different operations, among other policy validation rules. For those policies that are invalid (e.g., for failing one or multiple validation rules), a creation error response may be sent, as indicated at 660. The error response may indicate the validation error, in some embodiments.

As indicated at 640, quorum membership requests may be sent to proposed members determined from the creation request, in some embodiments. For example, the creation request may proposed a list of members (e.g., by user name or identifier). The creation requests may be sent to at least a subset of the proposed list of members, in some embodiments. In some embodiments, the members may be proposed by role. In some embodiments, a default technique for determining members may be used (e.g., by selecting one or more users from different teams or ranks within teams, such as senior manager, executive, etc.). The membership requests may indicate the quorum control to be applied, the account to which it may be applied, the proposed quorum policy, other quorum members, and/or other information which may be used to approve (or deny) the quorum control being created, in some embodiments.

As indicated at 650, a determination may be made as to whether sufficient proposed members accept the quorum, in some embodiments. For example, responses indicating approval (or denial may be received). In some embodiments, unanimous consent may be required to implement the quorum control. In some embodiments, a different number or criteria maybe implemented, such as a number of quorum members exceeding the policy approval requirement plus 2 additional members (e.g., 4+2 approvers). In some embodiments, a time requirement, similar to the time requirement for approving an action discussed below, may be imposed. In some embodiments, a denial or other rejection from a proposed member to create the quorum control could cause the quorum creation request to fail. In some embodiments, approval of a single proposed member (e.g., a subset of 1 proposed member) can allow the quorum control to proceed. In some embodiments (not illustrated), approval of quorum membership may not be required such that the quorum control is created and quorum members are automatically added (e.g., without explicit approval). Retries of the membership requests may be sent, in some embodiments. In some embodiments, if enough proposed members deny (or the timeout is exceeded) sufficient to make the proposed quorum control unable to be accepted, then a creation error response may be sent, as indicated at 660. The creation error response may indicate a failure to obtain approval from proposed quorum members, in some embodiments. If approved, then the quorum control may be enforced for the account, as indicated at 660, in some embodiments.

Different techniques for applying quorum controls may be implemented in different embodiments. FIG. 7 is a high-level flowchart illustrating various methods and techniques to implement obtaining quorum permission to perform an access control operation, according to some embodiments. As indicated at 710, a request to approve performance of an access control operation may be received that is associated with a quorum control, in some embodiments. The request may identify the associated quorum control (e.g., by an identifier, name, tag, or other indicator), in some embodiments. In some embodiments, the identity of the user making the request may be linked with the quorum control.

As indicated at 720, a determination may be made as to whether the operation is valid for quorum control, in some embodiments. For example, operations under quorum control may be specified in a policy for the quorum. For other operations that are not specified in the policy, other control mechanisms may be applied (although in some embodiments a default set or all operations may be included under quorum control). If not valid, then as indicated at 722, an error response may be sent for the request. For example, the error request may indicate the invalidity of the operation for quorum control, in some embodiments.

As indicated at 730, request(s) for approval may be sent to quorum member(s), in some embodiments. For example, the requests may specify the identity of the user, the access control operation (including parameters or other information specified for the access control, in some embodiments), and/or any other information used to decide whether to approve the access control operation (e.g., time of request, number, if any, of unsuccessful attempts to perform the access control operation, etc.). In some embodiments, the requests may be sent via a specified communication channel or system in the policy (e.g., email, user interface notification, mobile phone communication (e.g., phone call, SMS message), etc.).

Approvals (or denials) may be received via the same or a different communication channel, in some embodiments. For example, an email communication proposing an action may be responded to by logging into GUI interface to indicate approval. In another example, a text message could be responded to with another text message approval. Performance of the access control operation may receive approvals, as indicated at 740 and when enough approvals are received that satisfy the policy for the quorum control, as indicated by the positive exit from 750, then the access control operation may be approved. As indicated at 742, in some embodiments, a timeout, time-to-live, or other time period for approval may be enforced. If the access operation is not approved to satisfy the policy before the time period expires, then as indicated at 742, an error response may be sent indicating the failure of the request, as indicated at 722. In some cases some approvals may be received but the approval time may expire before enough approvals are received. In some embodiments, receiving an approval may restart the approval time period In some embodiments, a retry period may cause requests to approval for unresponsive members after a period of time, which may be less than the approval time period.

In some embodiments, a quorum control may act as a generic API proxy. A client application can send a signed request to the service implementing the quorum control with various parameters and/or other information of the access control operation to be performed. To send approvals of the request, quorum group members may also send a request invoke the same API with the same parameters and/or other information. When a sufficient number of the quorum group members invoke approval using the same API, then the requested access control operation may be performed (e.g., by the quorum control sending the same API request with the various parameters and/or other information).

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
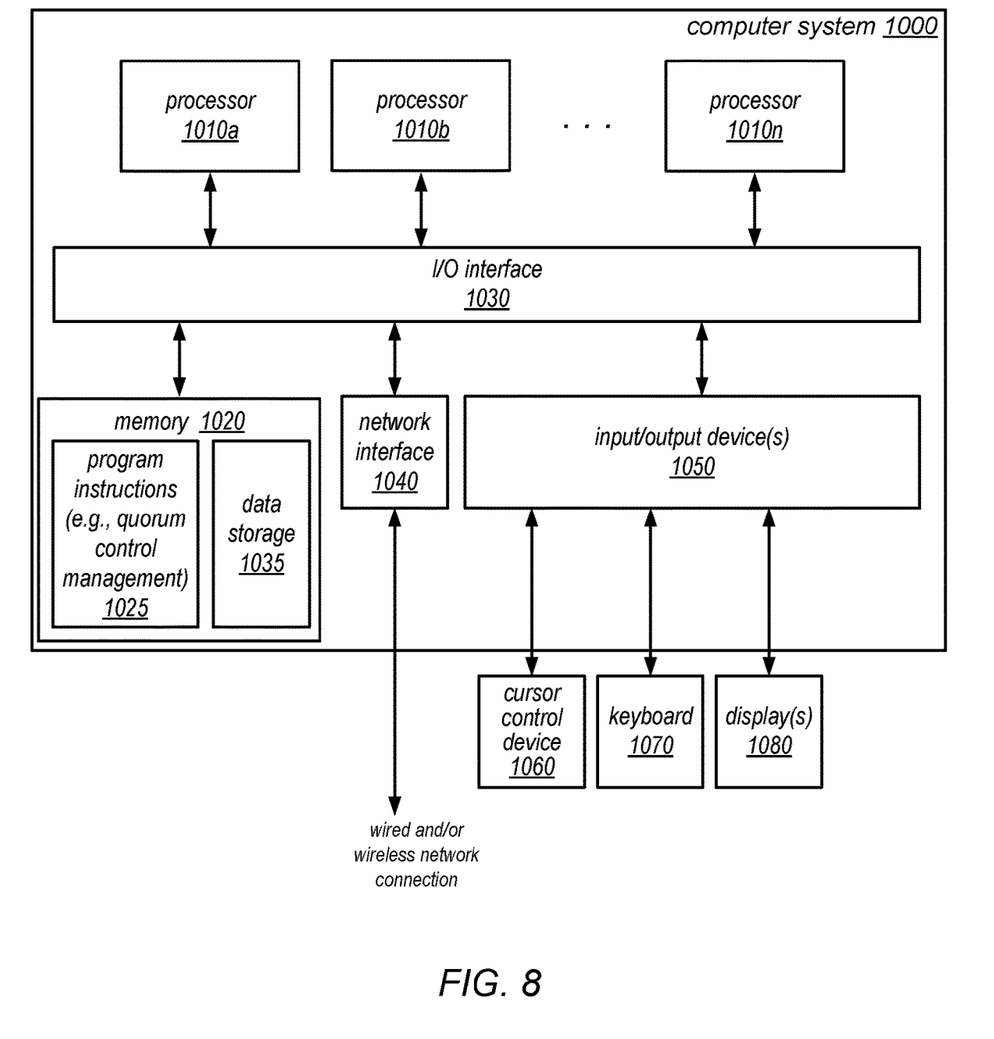
FIG. 8 illustrates an example system configured to implement the various methods, techniques, and systems described herein, according to some embodiments.

Embodiments of quorum-based access control management as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., quorum control management, quorum control creation, access control systems, services or other systems that implement quorum-based access control management) are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within a data lineage system may present data lineage services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement an access control system, the access control system configured to:
   receive a request, from a user of a plurality of users of an account of one or more systems, to create a quorum control for the account in place of a root user for the account when approving access control operations that modify an access control system as part of performing a privileged task reserved to the root user for the account according to a policy for the quorum control, wherein the request identifies users of the plurality of users of the account as quorum members for approving access control operations for the quorum control and includes an identification of the user making the request;
   determine whether the user is authorized to initiate the quorum control based on the identification of the user making the request;
   in response to determining that the user is authorized to initiate the quorum control, create the quorum control for the account according to the request to create the quorum control, wherein the quorum control utilizes the quorum members for approving access control operations for performing the privileged task for the account according to the policy;
   receive a request to perform an access control operation;
   request approval of the access control operation from the quorum members identified for approving access control operations for the quorum control;
   evaluate one or more approvals received from the quorum members with respect to the policy specified for the quorum control to determine that the request is approved; and
   perform the approved access control operation to perform the privileged task for the account.

2. The system of claim 1, wherein to create the quorum control for the account, the access control system is configured to:
   send respective membership proposals to a subset of the quorum members for the quorum control determined from the request to create the quorum control; and
   begin enforcement of the quorum control after receiving approval responses for membership in the quorum control from the subset of the quorum members.

3. The system of claim 1, wherein the access control system is further configured to:
   receive another request to perform another access control operation for the account;
   request approval of the access control operation from the quorum members identified for approving access control operations for the quorum control; and
   evaluate one or more responses received from the quorum members with respect to the policy specified for the quorum control to determine that the other request is denied.

4. The system of claim 1, wherein to evaluate the one or more approvals received from the quorum members with respect to the policy specified for the quorum control to determine that the request is approved, the access control system is configured to determine that the one or more approvals are received before expiration of a time period for obtaining approval of the access control operation.

5. A computer-implemented method, comprising:
   receive a request, from a user of a plurality of users of an account of one or more systems, to create a quorum control for the account in place of a root user for the account when approving one or more access control operations that modify an access control system as part of performing a privileged task reserved for the root user for the account according to a policy for the quorum control, wherein the request identifies users of the plurality of users of the account as quorum members for approving the one or more access control operations for the quorum control and includes an identification of the user making the request;
   determine whether the user is authorized to initiate the quorum control based on the identification of the user making the request;
   in response to determining that the user is authorized to initiate the quorum control, creating the quorum control for performing the one or more access control operations to permit an access control system to perform the privileged task on the account when approved according to the policy specified for the quorum control, wherein the quorum control utilizes the users of the account identified in the request as the quorum members for approving the one or more access control operations for performing the privileged task by the access control system according to the policy;
   applying the quorum control to determine approval for a request to perform an access control operation, comprising:
      obtaining one or more approvals from one or more quorum members of the quorum members of the quorum control;
      evaluating the one or more approvals with respect to the policy specified for the quorum control to determine that the request is approved; and
   providing, the approval of the access control operation.

6. The method of claim 5, wherein creating the quorum control comprises:
   sending respective membership proposals to a subset of possible quorum members for the quorum control determined from the request to create the quorum control; and
   begin enforcement of the quorum control after receiving approval responses for membership in the quorum control from a number of the subset of possible quorum members.

7. The method of claim 5, wherein creating the quorum control comprises:
   receiving a request to create the quorum control; and
   determining that the request to create the quorum control is associated with a user of the account that is authorized to create the quorum control.

8. The method of claim 5, further comprising:
receiving another request to approve performance of another access control operation;
evaluating one or more responses obtained from the one or more quorum members of the quorum members with respect to the policy specified for the quorum control to determine that the other request is denied; and
providing a denial of the other access control operation.

9. The method of claim 5, wherein the evaluating the one or more approvals with respect to the policy specified for the quorum control to determine that the request is approved comprises determining that the one or more approvals are received before expiration of a time period for obtaining approval of the access control operation.

10. The method of claim 5, wherein the policy specifies that respective numbers of different groups of quorum members for the quorum control approve of the access control operation.

11. The method of claim 5, wherein applying the quorum control to the request to perform the access control operation further comprises resending a request for approval to at least one quorum member of the one or more quorum members after expiration of a retry time period.

12. The method of claim 5, wherein applying the quorum control to the request to perform the access control operation further comprises determining that the access control operation is valid for application of the quorum control.

13. The method of claim 5, further comprising:
receiving a request to update the quorum control;
sending respective proposals to update the quorum control to the one or more quorum members for the quorum control; and
begin enforcement of the updated quorum control after receiving approval responses for the update from the one or more quorum members for the quorum control.

14. One or more non-transitory, computer-readable storage media, storing program instructions that when executed on or across one or more computing devices cause the one or more computing devices to implement:
receive a request, from a user of a plurality of users of an account of one or more systems, to create a quorum control for the account in place of a root user for the account when approving one or more access control operations that modify an access control system as part of performing a privileged task reserved to the root user for the account according to a policy for the quorum control, wherein the request identifies users of the plurality of users of the account as quorum members for approving the one or more access control operations for the quorum control and includes an identification of the user making the request;
determine whether the user is authorized to initiate the quorum control based on the identification of the user making the request;
in response to determining that the user is authorized to initiate the quorum control, creating the quorum control for performing the one or more access control operations to permit an access control system to perform the privileged task on the account when approved according to the policy specified for the quorum control, wherein the quorum control utilizes the users of the account identified in the request as the quorum members for approving the one or more access control operations for performing the privileged task by the access control system according to the policy;
receiving a request to approve performance of an access control operation;
requesting approval of the access control operation from one or more quorum members of the quorum members identified for the quorum control;
evaluating one or more approvals received from the one or more quorum members with respect to the policy specified for the quorum control to determine that the request is approved; and
providing the approval of the access control operation.

15. The one or more non-transitory, computer-readable storage media of claim 14, wherein, in creating the quorum control, the program instructions cause the one or more computing devices to implement:
sending respective membership proposals to a subset of possible quorum members of the quorum members for the quorum control determined from the request to create the quorum control; and
begin enforcement of the quorum control after receiving approval responses for membership in the quorum control from a number of the subset of possible quorum members.

16. The one or more non-transitory, computer-readable storage media of claim 14, wherein, in creating the quorum control, the program instructions cause the one or more computing devices to further implement:
determining whether approval responses for membership in the quorum control are received from the number of a subset of possible quorum members of the quorum members before expiration of a quorum control creation time period.

17. The one or more non-transitory, computer-readable storage media of claim 14, storing further instructions that when executed on or across the one or more computing devices cause the one or more computing devices to further implement:
receiving another request to approve performance of another access control operation; and
evaluating one or more responses obtained from the one or more quorum members with respect to the policy specified for the quorum control to determine that the other request is denied; and
providing the denial of the other access control operation.

18. The one or more non-transitory, computer-readable storage media of claim 17, wherein the other request is associated with a user of the account for which the quorum control is implemented and wherein the one or more non-transitory, computer-readable storage media store further instructions that when executed on or across the one or more computing devices cause the one or more computing devices to further implement enforcing a delay before performing a request for an additional access control operation associated with the user.

19. The one or more non-transitory, computer-readable storage media of claim 17, wherein the policy specifies an approval criteria for the other request different from the approved request.

20. The one or more non-transitory, computer-readable storage media of claim 14, wherein the account is an account of a provider network, wherein the one or more computing devices are implemented as part of an identity and access management service for the provider network and wherein the access control operation is to perform the privileged task with respect to a root user of the account of the provider network.

* * * * *